United States Patent [19]

Kondo et al.

[11] Patent Number: 5,819,221

[45] Date of Patent: Oct. 6, 1998

[54] SPEECH RECOGNITION USING CLUSTERED BETWEEN WORD AND/OR PHRASE COARTICULATION

[75] Inventors: Kazuhiro Kondo; Ikuo Kudo, both of Ibaraki, Japan; Yu-Hung Kao, Richardson; Barbara J. Wheatley, Plano, both of Tex.

[73] Assignee: Texas Instruments Incorporated, Dallas, Tex.

[21] Appl. No.: 298,689

[22] Filed: Aug. 31, 1994

[51] Int. Cl.$^6$ ........................................................ G10L 9/20
[52] U.S. Cl. .............................................. 704/255; 704/245
[58] Field of Search ........................................ 395/2.6, 2.64, 395/2.65, 2.66, 2.54, 2.79, 2.51; 364/419.08; 704/200, 251, 255, 256, 257, 4, 7, 9, 245, 270, 242

[56] References Cited

U.S. PATENT DOCUMENTS

| | | | |
|---|---|---|---|
| 4,852,279 | 8/1989 | Levinson | 381/43 |
| 4,908,865 | 3/1990 | Doddington et al. | 704/241 |
| 4,977,598 | 12/1990 | Doddington et al. | 704/255 |
| 4,984,178 | 1/1991 | Hemphill et al. | 364/513.5 |
| 5,384,892 | 1/1995 | Strong | 395/2.52 |
| 5,388,183 | 2/1995 | Lynch | 395/2.51 |
| 5,390,279 | 2/1995 | Strong | 395/2 |
| 5,418,717 | 5/1995 | Su et al. | 364/419.08 |
| 5,438,511 | 8/1995 | Maxwell, III et al. | 364/419.01 |
| 5,511,213 | 4/1996 | Correa | 395/800 |

OTHER PUBLICATIONS

ICASSP 91–International Conference on Speech, Acoustics and Signal processing, Takezawa et al., "Linguistic constraints for continous speech recognition in goal–directed dialogue", pp. 801–804 vol. 2 May 1991.

Paul, Douglas B., The Lincoln Continuous Speech Recognition System: Recent Development And Results, Lincoln Laboratory, MIT, Lexington, MA, pp. 160–166, Feb. 1989.

Giachin, E.P., et al., Word Juncture Modeling Using Phonological Rules for HMM–Based Continous Speech Recognition, Computer Speech and Language (1991), pp. 155–168, Apr. 1991.

Hwang, M., et al., Modeling Between–Word Corarticulation in Continuous Speech Recognition, School of Computer Science, Carnegie Mellon University, Pittsburgh, PA, pp. 05–08, Sep. 1989.

Cardin, R., et al, Inter–word Coarticulation Modeling and MMIE Training for Improved Connected Digit Recognition, 1993 IEEE, pp. II–243–II–246, Apr. 1993.

Chou W., et al., An Algorithm of High Resolution and Efficient Multiple Sting Hypothesization for Continous Speech Recognition Using Enter–Word Models, 1994 IEEE, pp. II–153–11–156; Apr. 1994.

Itou, K. et al., Continuous Speech Recognition by Context-–Dependent Phonetic HMM and an Efficient Algorithm for Finding N–Best Sentence Hypothesis, 1992 IEEE, pp. I–21–I–24, Jun. 1992.

Eurospeech 89; Hwang et al, "Modeling between–word coarticulation in continuous speech recognition" pp. 5–8 vol. 2, Sep. 1989.

*Primary Examiner*—Richemond Dorvil
*Attorney, Agent, or Firm*—Robert L. Troike; Wade James Brady, III; Richard L. Donaldson

[57] ABSTRACT

Improved speech recognition is achieved according to the present invention by use of between word and/or between phrase coarticulation. The increase in the number of phonetic models required to model this additional vocabulary is reduced by clustering 19, 20 the inter-word/phrase models and grammar into only a few classes. By using one class for consonant inter-word context and two classes for vowel contexts, the accuracy for Japanese was almost as good as for unclustered models while the number of models was reduced more than half.

4 Claims, 3 Drawing Sheets

| CASE | INTERWORD CONTEXT | CONTEXT POSITION | CLUSTER | MEMBER PHONES |
|---|---|---|---|---|
| I | INDE-PENDENT | RIGHT | ALL CONTEXT | /i/,/n/,/s/,/y/,/g/,/r/,/h/,/k/,/z/,/m/, SILENCE |
| | | LEFT | ALL CONTEXT | /i/,/N/,/o/,/u/,/a/, SILENCE |
| II | DEPENDENT | RIGHT | — | ALL 11 CONTEXT TREATED SEPARATELY |
| | | LEFT | — | ALL 6 CONTEXT TREATED SEPARATELY |
| III | | RIGHT | SILENCE | SILENCE |
| | | | VOWEL | /i/ |
| | | | BILABIAL | /h/,/m/ |
| | | | DENTAL-ALVEOLAR | /s/,/n/,/z/,/r/ |
| | | | PALATAL-VELAR | /g/,/y/,/k/ |
| | | LEFT | — | ALL 6 CONTEXT TREATED SEPARATELY |
| IV | | RIGHT | SILENCE | SILENCE |
| | | | VOWEL | /i/ |
| | | | CONSONANT | /h/,/m/,/s/,/n/,/z/,/r/,/g/,/y/,/k/ |
| | | LEFT | — | ALL 6 CONTEXT TREATED SEPARATELY |
| V | | RIGHT | SILENCE | SILENCE |
| | | | VOWEL | /i/ |
| | | | CONSONANT | /h/,/m/,/s/,/n/,/z/,/r/,/g/,/y/,/k/ |
| | | LEFT | SILENCE | SILENCE |
| | | | HIGH VOWEL | /i/,/u/ |
| | | | MID-LOW VOWEL | /a/,/o/ |
| | | | NASAL | /N/ |
| VI | | RIGHT | SILENCE | SILENCE |
| | | | ALL PHONES | /i/,/n/,/s/,/y/,/g/,/r/,/h/,/k/,/z/,/m/ |
| | | LEFT | SILENCE | SILENCE |
| | | | ALL PHONES | /i/,/N/,/o/,/u/,/a/ |

*FIG. 3*

| CASE | NUMBER OF MODELS | ERROR RATE | | | | |
|------|------------------|------------|---------|-----------|------|----------|
|      |                  | SUBSTITUTION | DELETION | INSERTION | WORD | SENTENCE |
| I    | 96               | 1.6        | 0.4     | 0.4       | 2.5  | 18.1     |
| II   | 461              | 1.0        | 0.4     | 0.3       | 1.7  | 13.3     |
| III  | 320              | 1.0        | 0.4     | 0.3       | 1.7  | 12.9     |
| IV   | 268              | 1.1        | 0.4     | 0.3       | 1.8  | 13.2     |
| V    | 222              | 1.1        | 0.3     | 0.4       | 1.8  | 13.6     |
| VI   | 146              | 1.2        | 0.4     | 0.5       | 2.0  | 15.1     |
*FIG. 4*
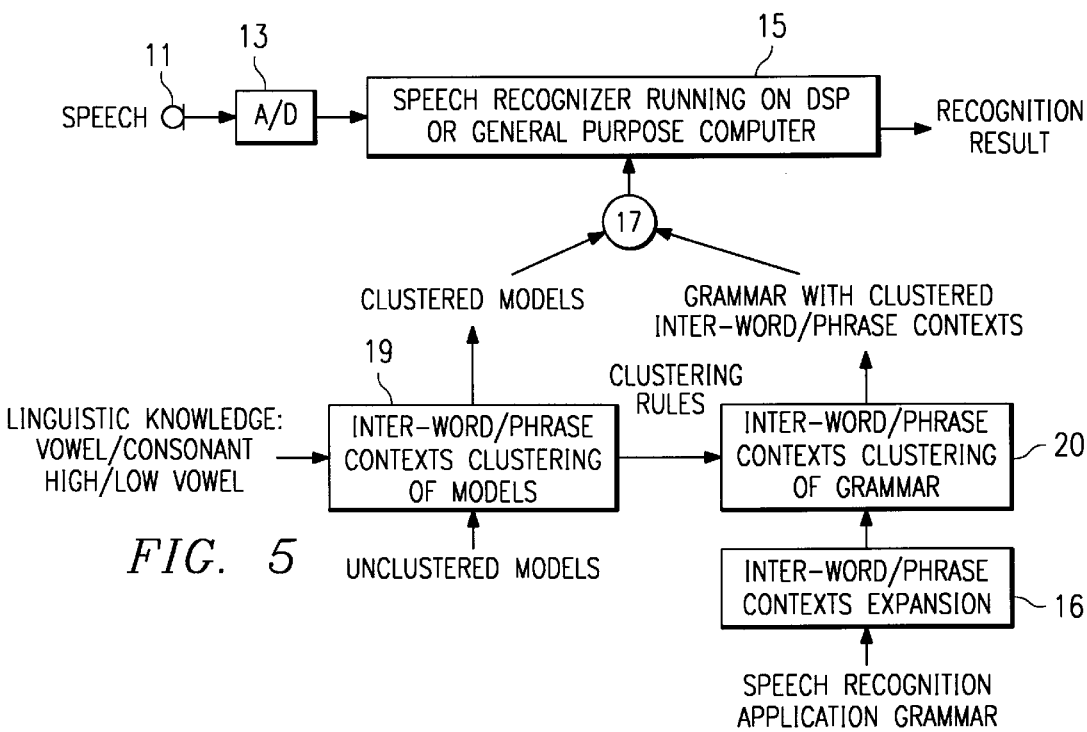
*FIG. 5*
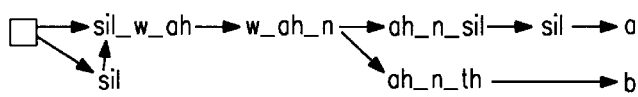
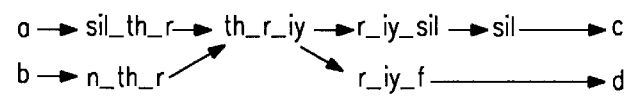
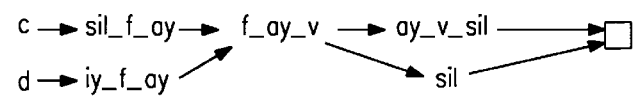
*FIG. 6*

SPEECH RECOGNITION USING CLUSTERED BETWEEN WORD AND/OR PHRASE COARTICULATION

TECHNICAL FIELD OF THE INVENTION

This invention relates to speech recognition and more particularly to speech modeling using between word and/or between phrase coarticulations.

BACKGROUND OF THE INVENTION

It has been shown previously for English that modeling between-word coarticulation in continuous speech drastically improves the recognition accuracy. For an example, see the following references:

(1) M.-Y. Hwang, H.-W. Hon, and K.-F. Lee, "Modeling Between-Word Coarticulation in Continuous Speech Recognition," Proc. Euro-speech '89, Paris, France, September 1989.

(2) D. B. Paul, "The Lincoln Continuous Speech Recognition System: Recent Development and Results," Proc. DARPA Speech and Natural Language Process. Workshop, Philadelphia, Pa. February 1989.

(3) R. Cardin, Y. Normandin, and E. Millien, "Inter-Word Coarticulation Modeling and MMIE Training for Improved Connected Digit Recognition," Proc. IEEE International Conf. Acoust. Speech, Signal Process., Minneapolis, Minn., April, 1993.

(4) T. Watanabe, R. Isotani, and S. Tsukada, "Speaker-Independent Speech Recognition Based on Hidden Markov Model Using Demi-Syllable Units," IEICE Trans. Part D-II, vol. J75-D-II, no. 8, pp.1281–1289, August 1992.

However, by introducing additional phoneme variation models to account for these coarticulations, the required number of models increases significantly. This will mean more memory is needed to store these models, and more computation will be needed to match additional context with input speech. Efficient parsers which will reduce the added computation have been proposed previously. See the following references. for example:

(5) W. Chou, T. Matsuoka, B.-H. Juang, and C.-H. Lee, "An Algorithm of High Resolution and Efficient Multiple String Hypothesization for Continuous Speech Recognition Using Inter-Word Models," Proc. IEEE International Conf. Acoust. Speech, Signal Process., Adelaide, Australia, April, 1994.

(6) K. Itou, S. Hayamizu, and H. Tanaka, "Continuous Speech Recognition by Context-Dependent Phonetic HMM and an Efficient Algorithm for Finding N-Best Sentence Hypothesis," Proc. IEEE International Conf. Acoust. Speech, Signal Process., San Francisco, Calif., March, 1992.

SUMMARY OF THE INVENTION

In accordance with one embodiment of the present invention, a speech recognition model comprises between-word and/or between-phrase coarticulation, where the between-word or between-phrase coarticulation is clustered into only a few classes.

These and other features of the invention that will be apparent to those skilled in the art from the following detailed description of the invention, taken together with the accompanying drawings.

DESCRIPTION OF THE DRAWINGS

FIG. 3 illustrates tested clustering schemes;

FIG. 4 illustrates test results;

FIG. 5 illustrates the speech recognition system according to one embodiment of the present invention; and FIG. 6 illustrates a sentence model for an example digit string "one three five" for training.

DESCRIPTION OF PREFERRED EMBODIMENTS

Applicants found that by compiling a network of context-dependent phonetic models which models the inter-word or inter-phrase (interword/phrase) context, drastic reduction of over 30% in recognition errors can be achieved compared to models which do not account for these inter-word context. However, this significantly increases the number of phonetic models required to model the vocabulary. To overcome this increase, Applicants teach herein to cluster the inter-word/phrase context into only a few classes. Using one class for consonant inter-word context and two classes for vowel context, the recognition accuracy on digit string recognition in Japanese was found to be virtually equal to the accuracy with unclustered models, while the number of phonetic models required were reduced by more than 50%.

The word or phrase models used in this work were constructed by concatenating triphone models into a network which will model both the intra-word phonetic context and the inter-word/phrase context. Unlike the methods described in reference 1, Applicants did not distinguish triphones by its position, in other words, distinguish triphones that are at the beginning, middle, or end of a word. Later on, however, when Applicants start clustering the inter-word/phrase phones, Applicants will distinguish these phones from triphones in the middle of a word.

Figure 1:
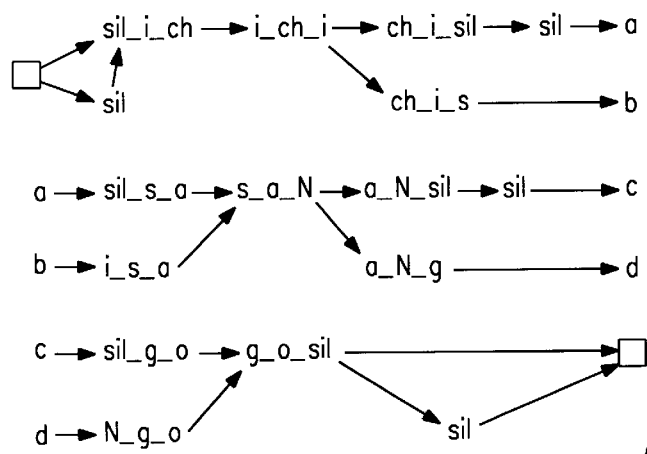
FIG. 1 illustrates a sentence model for an example digit string "ichi san go" for training.

FIG. 1 shows the training sentence grammar for the Japanese digit string "ichi(1) san(3) go(5)." Each word has two paths coming into each word and going out. One path goes through a silence (sil), while the other path connects directly to the neighboring word.

Figure 2:
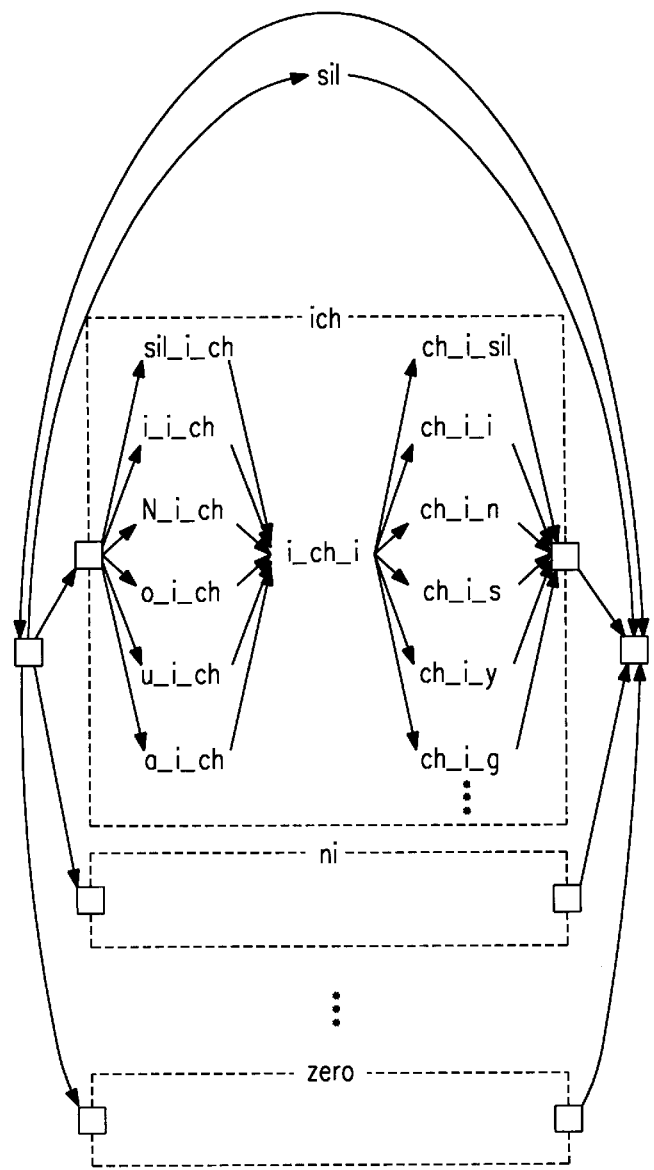
FIG. 2 illustrates a sample sentence model for a Japanese digit string recognition.

FIG. 2 illustrates the recognition sentence grammar for the Japanese digit recognition task using a null grammar (digit loop grammar). Each word model is constructed by concatenating all valid triphone models with all possible right and left inter-word/phrase context in parallel, in addition to the conventional intra-word triphone. The selection of the appropriate inter-word context is completely unsupervised. The context can be restricted according to the neighboring word in the search path, thereby reducing the search space, at a cost of added complexity. However, it was found empirically that leaving this context modeling path unsupervised does not have significant impact on the performance, and thus it was decided to leave the search unrestricted.

By introducing inter-word context dependencies, the number of required models increases significantly, as has been pointed out in earlier works. For the digit recognition task, the number of triphone models increased from 96 for the inter-word context independent case, to 461 for the context dependent case.

To limit the increase in the required number of models to a minimum, Applicants teach herein to cluster the inter-word context into a very few classes, and found that this does not affect the recognition accuracy significantly.

The corpus used in these experiments was a proprietary corpus for the voice dialing task. This is discussed by K. Kondo, J. Picone, and B. Wheatley in "A Comparative Analysis of Japanese and English Digit Recognition," *Proc. IEEE International Conf. Acoust. Speech, Signal Process.*, Adelaide, Australia, April, 1994. The collected speech consisted of command phrases (such as "call home"), as well as continuous digit strings. Only the latter was used for the tests described here. A table-mounted linear microphone was used, and low to moderate level of noise was included in the background. There were 221 speakers, 112 men and 109 women. Each speaker spoke 100 sentences, of which half were digit strings. Approximately 80% of the data for each sex was used for training, while the remaining was used for testing. No overlap in speakers between the test set and training set exists. Overall, a total of 5,447 male utterances and 5,380 female utterances were used for training, and 2,068 male and female utterances were used for testing.

The recognition system used here is an LPC-based HMM (Hidden Marcov Model) recognizer. For an example, see the following reference: G. R. Doddington, "Phonetically Sensitive Discriminants for Improved Speech Recognition," Proc. ICASSP 89, May, 1989. Speech is sampled at 8 kHz, LPC analysis is applied, and the LPC (Linear Predictive Coding) parameters are transformed into a feature vector. The feature vector is composed of spectral energy vectors output from a filter bank consisting of 14 mel-spaced filters, the short-term differences of these spectral energies, the speech level, and some voicing indicators. The total number of elements is 34. A linear transformation designed to normalize the covariance statistics of the feature vector is applied, and the least significant 18 features are dropped, resulting in a vector dimension of 16. A more detailed description is found in U.S. Pat. No. 4,908,865 entitled, "Speaker Independent Speech Recognition Method and System," of Doddington, et al. This patent is incorporated herein by reference. A unimodal Gaussian continuous distribution model is used along with a Viterbi-style maximum likelihood path scoring in the HMM model. A more detailed description is found in U.S. Pat. No. 4,977,598 entitled, "Efficient Pruning Algorithm for Hidden Markov Model Speech Recognition," of Doddington, et al. This patent is incorporated herein by reference.

The models were finite duration (no self-loops) models since we have observed consistently better performance with these models compared to infinite models with self-loops. The number of states in each model depends on the average duration of phone. The durations were computed from Viterbi aligned statistics with an initial set of monophones.

FIG. 3 shows the various context clustering schemes tested, from inter-word context dependent models with no clustering (Case II), to context dependent models with all phonetic contexts excluding silence context clustered into one (Case VI). Test result for inter-word context-independent models (Case I) were included for comparison. The right context position refers to the articulation after the word or phrase, and the left context position refers to before the word or phrase.

For Case III, there are five classes to the right or after the word or phrase. Each cluster is a general feature vector for the sounds represented by the phonetic symbols. For Case III, there is silence; a vowel cluster with the phone for /i/; a bilabial (where the articulation point is at the lips) cluster for the phones for phonetic symbols and /s/, /n/, /z/, /r/; and a palatalvelar (where the articulation is palatal or velar) cluster for the phones /g/, /y/, /k/. There is for Case III for the left or before the word/phrase all six context treated separately or no clustering.

For Case IV, there are three cluster feature vectors to the right, or after the word/phrase. They are silence; vowel cluster with /i/ sound; and common feature vector for the consonant for /h/, /m/, /s/, /n/, /z/, /r/, /g/, /y/, /k/. For Case IV to the left of other word/phrase, all six contexts are treated separately.

For the preferred Case V, there are three clusters to the right of the word/phrase which are silence; vowel cluster with phone /i/; and consonant cluster with common feature vector for /h/, /m/, /s/, /n/, /z/, /r/, /g/, /y/, and /k/. For the left, or before the word/phrase, there is silence; high vowel cluster with /i/, and /u/ phones; mild-low vowel cluster with /a/ and /o/ phones; and nasal cluster with /N/ phone.

For Case VI, there are two clusters to the right of the word/phrase that are silence and all phones and two classes to the left, which are silence and all phones.

FIG. 4 shows the results for each case.

From the performances for Cases I and II, the introduction of inter-word context dependency decreases the word error rate from 2.5% to 1.7%, a 32% relative decrease in error rate. This comes with the cost of a five-fold increase in the number of models required to model the vocabulary. It is also interesting to point out that in these cases, as well as in other cases, most of the differences in the error rate can be seen in the substitution errors, not in the insertion or deletion errors.

Cases III through V compare the different clustering schemes. Results for Case III shows that clustering of consonant contexts into a few classes will have no effect on word errors, while Case IV shows that clustering of all consonant context will have only a minor increase in errors. The additional clustering of vowel context into two classes for Case V did not show increase in word errors, and a slight increase in sentence error rate. The reduction in required number of models for Case V compared to the unclustered Case II was more than two fold, while the word error rate increase was kept within 0.1%. Finally, Case VI shows that by just separating the silence context from other phone context, word errors can still be reduced considerably compared to the inter-word context independent models in Case 1.

The results obtained were with inter-word context dependent models. The models were trained with a sentence grammar which supervises both the inter-word and intra-word context. The recognition grammar allows paths to all inter-word context dependent triphones in parallel, and poses no restriction on the search path. Even with this simple grammar, it was possible to reduce the error rate by more than 30% compared to models which do not model the inter-word context. We also proposed clustering schemes for the inter-word context. By clustering all consonants into one class and vowels into two classes, the total number of models required can be halved, while keeping the error rate increase within 0.1%.

Referring to FIG. 5, there is illustrated a speech recognition system according to one embodiment of the present invention. The incoming speech would be picked up, for example, at a microphone 11 and coupled to an analog-to-digital (A/D) converter 13. As discussed previously, the speech is sampled at 8 KHz. The digitized speech input would be processed using a recognizer program running on a digital signal processor (DSP), or a general purpose computer 15. As discussed previously, the recognizer is an LPC-based HMM recognizer. The program memory finds the best match of the input speech to that in the database, or data structure 17, to provide the recognition result. In accordance with the teaching herein, the database, or data structure 17, comprises clustered models and grammar with clustered inter-word/phrase contexts. The clustered models are formed, as illustrated in FIG. 5, by clustering the inter-word/phrase contexts according to the clustering schemes of FIG. 3, for example. In the preferred embodiment of Class V, this clustering of between word or phrase contexts is based on a linguistic knowledge base, for example vowels, consonants, high vowels, low vowels, nasals, silence, etc. The grammar with clustered inter-word/phrase contexts is from a speech recognition grammar, such as the three digits grammar, that is expanded with inter-word/phrase contexts expansion (16 in FIG. 5) such as shown in FIG. 1. The same clustering rules for the clustering of models is applied on the grammar such as Class V clustering using vowels, consonants, high vowels, low vowels, etc. The clustering for the models and grammar may be done according to the other classes illustrated in FIG. 3 depending on the storage space available in the data structure 17.

Although the tests conducted here were for Japanese, we believe that similar methods will apply to other languages as well. The clustering scheme, as well as its efficiency, will differ, however. An example for English is shown in FIG. 6. FIG. 6 illustrates the sentence model for an example digit string "one three five" for training.

This application specifically describes the optimal clustering for interphrase contexts for Japanese digits. However, the optimal clustering for other languages and other vocabularies can be derived experimentally following the same methodology. The key idea of this invention is the modeling of interphrase contexts to capture the co-articulation effects and then the clustering of contexts to significantly reduce the number of models without sacrificing recognition performance. The application to other languages and vocabularies is obvious.

The results shown here used phonetic models. However, the same inter-word context and its clustering scheme should also apply to other modeling units, such as word models.

What is claimed is:

1. A speech recognizer comprising:

first storage for storing first phonetic models comprising models with within word phonetic word contexts clustered into a first set of given classes and for storing first speech recognition grammar with phonetic within word contexts clustered according to said first set of given classes;

second storage for storing second phonetic models comprising models with phonetic between word or phrase contexts clustered into a second set of given classes being generic classes and being significantly fewer classes than said first set of given classes and for storing second speech recognition grammars with phonetic between word or phrase contexts clustered according to said second set of given classes; and means for comparing incoming speech to said first phonetic models and said second phonetic models and said first grammar and said second grammar to provide a best match output therefrom.

2. The recognizer of claim 1 wherein one of said second set of given classes is for silence context; a second of said second set of said given classes is for consonants; and a third of said second set of said given classes is for vowels.

3. The recognizer of claim 2 wherein phonetic between word or phrase context dependent models to the right of a word/phrase includes a silence class, a vowel class, and a consonant class, and for phonetic context dependent models to the left of a word/phrase includes a silence class, a high vowel class, a mid-low vowel class, and a nasal class.

4. A method for speech recognition comprising the steps of:

providing models comprising within word context models;

providing models comprising phonetic between word or phrase context models;

clustering said phonetic between word or phrase context models according to linguistic knowledge classes of silence, consonants and vowels to form generic clustered models for silence, consonants and vowels;

providing speech recognition grammar;

phonetic between word or phrase contexts expanding of said speech recognition grammar;

clustering said expanded phonetic between word or phrase contexts of said speech recognition application grammar according to generic classes of silence, consonants, and vowels to form grammars with clustered phonetic between word or phrase contexts; and comparing input speech to said models and said generic clustered models and said clustered phonetic between word or phrase contexts of said speech recognition grammar to identify a best match.

\* \* \* \* \*